Dec. 5, 1950   W. M. MYERS   2,532,568
VALVE UNIT
Filed March 29, 1946

INVENTOR.
Wm. M. Myers
BY
*Webster & Webster*
ATTYS

Patented Dec. 5, 1950

2,532,568

UNITED STATES PATENT OFFICE 2,532,568

VALVE UNIT

William M. Myers, Fresno, Calif.

Application March 29, 1946, Serial No. 658,004

2 Claims. (Cl. 137—139)

This invention relates in general to an improved valve unit adapted to be interposed in a fluid pressure conduit to control flow therethrough; the valve unit being especially designed for use in the air pressure supply conduit of a sandblasting machine.

An object of the present invention is to provide a novel valve unit arranged to be controlled from a remote point as is desired in certain installations; such as when the valve unit is used in connection with a sandblasting machine.

Another object of the invention is to provide a valve unit wherein opening and closing of the valve therein is accomplished by the relative pressure in chambers on opposite sides of a valve operating diaphragm; the unit including a bleed passage between said chambers, and novel protective means to prevent foreign matter from gaining access to and clogging said bleed passage.

A further object of the invention is to provide a valve unit which is smooth and rapid in operation; foolproof; and requires a minimum of maintenance or repair.

A further object of the invention is to provide a practical valve unit, and yet one which is effective for the purposes for which it is designed.

These objects are accomplished by means of such structure and relative arrangement of parts as will fully appear by a perusal of the following specification and claims.

Figure 1:
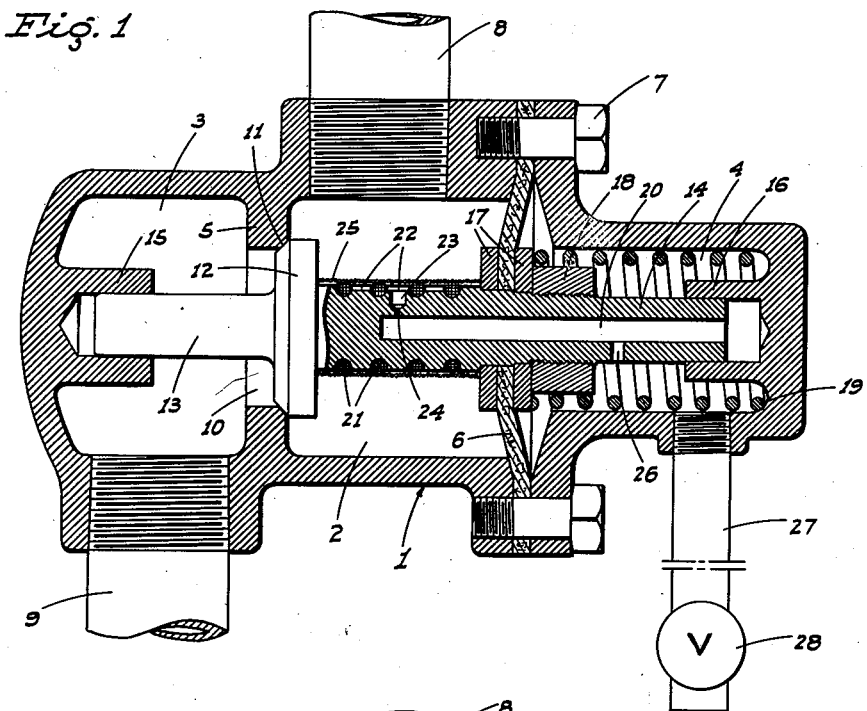
Fig. 1 is a sectional elevation of the unit with the valve in closed position.

Referring now more particularly to the characters of reference on the drawings, the valve unit comprises a hollow body, indicated generally at 1, which body is separated, internally, into a main pressure chamber 2, a pressure outlet chamber 3, and a control pressure chamber 4. A partition 5 separates the pressure chamber 2 and pressure outlet chamber 3, while a diaphragm 6 separates the pressure chamber 2 and control pressure chamber 4. The diaphragm 6 is clamped, adjacent its periphery, between initially separate portions of the body by means of cap screws 7.

A fluid pressure supply pipe 8 is threaded into the body 1 in communication with the pressure chamber 2, and a pressure delivery pipe 9 is threaded into the body in communication with the pressure outlet chamber 3.

The partition 5 is formed with a central port 10 therethrough, which port is formed with an annular tapered valve seat 11, with which a circular valve 12 cooperates. The circular valve 12 is supported for axial movement by means of oppositely projecting stems 13 and 14; the stem 13 engaging in slidable relation in a guide boss 15 in the pressure outlet chamber 3. The stem 14 projects centrally through the diaphragm 6 and slidably extends into a guide boss 16 in the central pressure chamber 4.

The stem 14 is locked, intermediate its ends, to the diaphragm 6, as follows:

A pair of clamping washers 17 are disposed on opposite sides of said diaphragm, with the washer which is in the pressure chamber 2 riding against a stop shoulder, as shown. A clamping nut 18 is threaded on the stem 14 in the control pressure chamber 4 and bears against the adjacent washer 17, whereby to secure the assembly together. It will be seen that upon flexing of the diaphragm in one direction or the other, the stem 14 will be correspondingly shifted in an axial direction, whereby to open or close the valve 12. The body 1 is formed so as to permit of such movement of the diaphragm.

A helically wound compression spring 19 is disposed in the control pressure chamber in surrounding relation to the stem 14, said spring bearing at one end against the adjacent clamping washer 17, and at the other end against the body.

The spring 19 acts in a direction tending to close the circular valve 12.

The stem 14 is formed with an axial bore 20 open from the end of said stem in chamber 4 to a point adjacent but short of the circular valve 12. Within the pressure chamber 2 the stem 14 is formed with a series of spaced, circumferential grooves 21, and a longitudinal channel 22 establishes communication between said circular grooves radially inwardly of the peripheral surface of the adjacent portion of said stem. A short, radial bore 23 leads from the channel 22 between a pair of said grooves 21, and said radial bore terminates short of the axial bore 20. A very small bleed duct 24 communicates between the radial bore 23 and the axial bore 20.

A perforate or screen sleeve 25 closely surrounds the stem 14 between the circular valve 12 and the adjacent clamping washer 17, whereby to prevent access of foreign matter into the described arrangement of grooves 21, channel 22, radial bore 23, and bleed duct 24. The grooves 21 and channel 22 are provided so as to assure a free delivery of pressure from within chamber 2 to the radial bore 23, and through the bleed duct 24 into the axial bore 20.

In order that pressure from the axial bore 20 may deliver into the control pressure chamber 3 without creating any back pressure in the axial bore 20, a lateral bleed opening 26 is formed in the stem in communication with said axial bore 20.

A control conduit 27 is threaded into the body 1 in communication with the control pressure chamber 4, and said conduit 27, which may be of substantial length, has a hand actuated valve 28 interposed therein adjacent its outer end.

While the described valve unit is adaptable for many uses, it is primarily designed for use in connection with a sandblasting machine, wherein it functions as follows:

The described valve unit is mounted on the sandblasting machine, and air pressure is supplied through pipe 8 to said valve unit, and from the latter said pressure delivers into the machine by pipe 9 when valve 12 is open.

Sandblasting machines normally include a relatively long air-sand delivery hose having a nozzle on the outer end thereof, and in this type of machine the control conduit 27 is extended to a point with the valve 28 adjacent said nozzle for ready access by the operator.

When pressure is created in chamber 2 from pipe 8, it immediately feeds through the described bleed passage arrangement into the control pressure chamber 4, causing the pressures in chambers 2 and 4 to equalize, whereupon the spring 19 closes the valve 12; assuming that the hand actuated valve 28 is likewise closed. With valve 12 closed no air delivers to the sandblasting machine, and the latter is inoperative.

Figure 2:
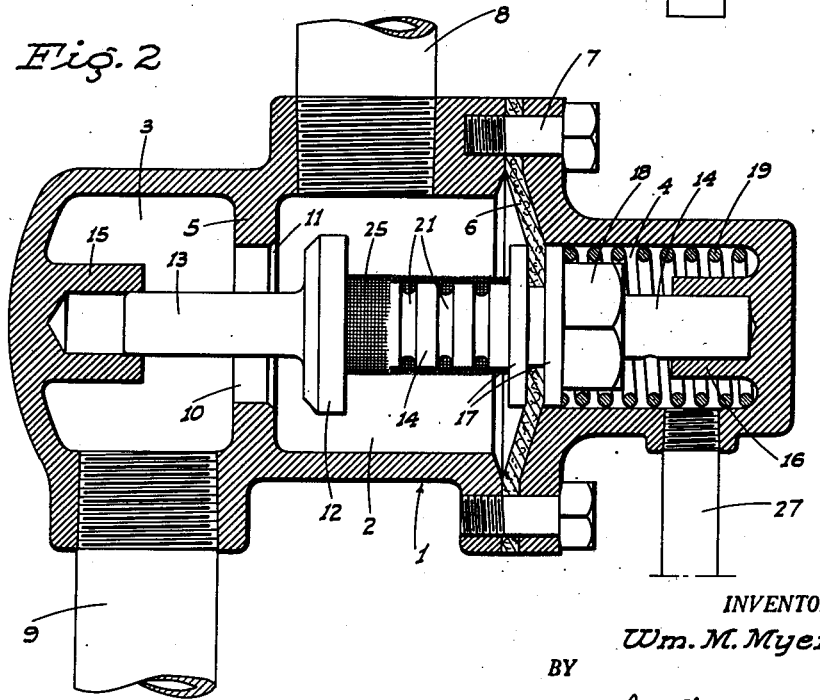
Fig. 2 is a similar view, but shows the valve in open position.

When the operator desires the sandblasting machine to function he merely opens the valve 28, which relieves the pressure in chamber 4. As the conduit 27 is of a diameter to relieve the pressure in said chamber 4 more rapidly than it can build up through the described bleed passage arrangement, a differential in pressures results on opposite sides of the diaphragm 6; i. e. the pressure in chamber 2 is much greater than the pressure in chamber 4. When this occurs the diaphragm is forced from the position shown in Fig. 1 to the position shown in Fig. 2, whereupon the valve 12 is moved to its open position and air pressure delivers to the sandblasting machine.

To shut off the valve unit and consequently discontinue operation of the sandblasting machine, the operator closes valve 28. When this occurs the pressures in chambers 2 and 4 quickly equalize, and the valve unit moves to its closed position under the influence of spring 19, as heretofore described.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a valve unit, a hollow body, a diaphragm mounted therein to form a main pressure chamber and another chamber, a valve in the body, a stem on the valve extending from the main chamber into the other chamber axially through and attached to said diaphragm, spring means urging the stem in a valve closing direction, there being passage means formed in the stem to bleed pressure from the main chamber to the other chamber, and means to release pressure from said other chamber; said passage means being formed by providing the stem with an axial bore open to the other chamber, a radial bleed duct in the stem extending from said bore into communication with the main chamber, a screen sleeve surrounding the portion of the stem in said main chamber, that portion of the stem in the main chamber being formed with a plurality of spaced circumferential grooves, and a longitudinal channel connecting said grooves, the radial bleed duct opening into said channel.

2. A valve unit comprising a hollow body, a diaphragm, and a partition in the body separating the same into a central main pressure chamber, an outlet pressure chamber beyond the partition, and a control pressure chamber beyond the diaphragm; there being fluid pressure supply means opening into the main pressure chamber, fluid pressure outlet means opening from the outlet pressure chamber, and fluid pressure release means arranged with the control pressure chamber; a valve stem extending axially through the diaphragm and attached thereto, a valve on the stem in the main pressure chamber, the partition having a valve port therein with which the valve cooperates, a helical, compression spring in the control pressure chamber about the same and urging the diaphragm in the direction of the partition, and bleed passage means in the stem communicating at opposite ends with the main chamber and control pressure chamber; said bleed passage means being formed by an axial bore in the stem open to the control pressure chamber, a radial bleed duct in the stem from the bore, a longitudinal channel on the stem in the main chamber, the bleed duct opening into the channel, a plurality of spaced circumferential grooves on the stem in the main chamber, the channel intersecting said grooves, and a screen sleeve on the stem in the main chamber in protective relation to said grooves, channel, and duct.

WILLIAM M. MYERS.

REFERENCES CITED

The following references are of record in the file of this patent:

UNITED STATES PATENTS

| Number | Name | Date |
|---|---|---|
| 272,196 | Birkery | Feb. 13, 1883 |
| 493,774 | Howes | Mar. 21, 1893 |
| 762,538 | Lamb | June 14, 1904 |
| 1,333,646 | Watrous | Mar. 16, 1920 |
| 1,579,785 | Rouleau | Apr. 6, 1926 |
| 1,876,223 | Hagey | Sept. 6, 1932 |
| 2,328,008 | Griswold | Aug. 31, 1943 |